US007941191B2

(12) United States Patent
Hanssen et al.

(10) Patent No.: US 7,941,191 B2
(45) Date of Patent: May 10, 2011

(54) MAGNETIC HINGE MECHANISM FOR WIRELESS COMMUNICATION DEVICES

(75) Inventors: Matthew Paul Hanssen, Wake Forest, NC (US); John Thomas Sadler, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 937 days.

(21) Appl. No.: 11/679,207

(22) Filed: Feb. 27, 2007

(65) Prior Publication Data

US 2008/0201905 A1 Aug. 28, 2008

(51) Int. Cl.
*H04B 1/38* (2006.01)

(52) U.S. Cl. ........... 455/575.3; 455/575.4; 455/90; 16/366

(58) Field of Classification Search ............... None
See application file for complete search history.

(56) References Cited

U.S. PATENT DOCUMENTS

| 2002/0061733 | A1* | 5/2002 | Wang ............... 455/90 |
| 2005/0000059 | A1 | 1/2005 | Sung et al. |
| 2005/0059443 | A1* | 3/2005 | Pan et al. ........... 455/575.4 |
| 2007/0293283 | A1 | 12/2007 | Inubushi et al. |
| 2008/0256751 | A1* | 10/2008 | Hirose ............... 16/366 |

FOREIGN PATENT DOCUMENTS

| EP | 1496674 A2 | 1/2005 |
| WO | 2006030607 | 3/2006 |

OTHER PUBLICATIONS

"International Search Report," International Application No. PCT/US2007/085215, May 21, 2008, European Patent Office, Rijswijk, Netherlands.

* cited by examiner

*Primary Examiner* — Phuoc Doan
(74) *Attorney, Agent, or Firm* — Coats & Bennett, PLLC.

(57) ABSTRACT

A hinge mechanism movably connects two housings of a wireless communication device such that the housing move relative to each other between open and closed positions. The hinge mechanism include a magnetic detent that initially resists the housing moving between the open and closed positions. However, the magnetic detent yields to move the housing between the open and closed positions whenever a user applies an amount of force that is sufficient to overcome the initial resistance.

8 Claims, 6 Drawing Sheets

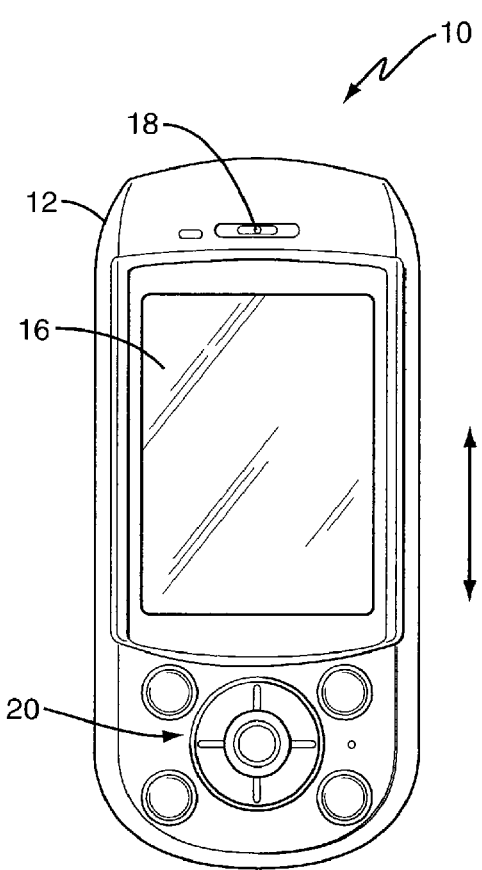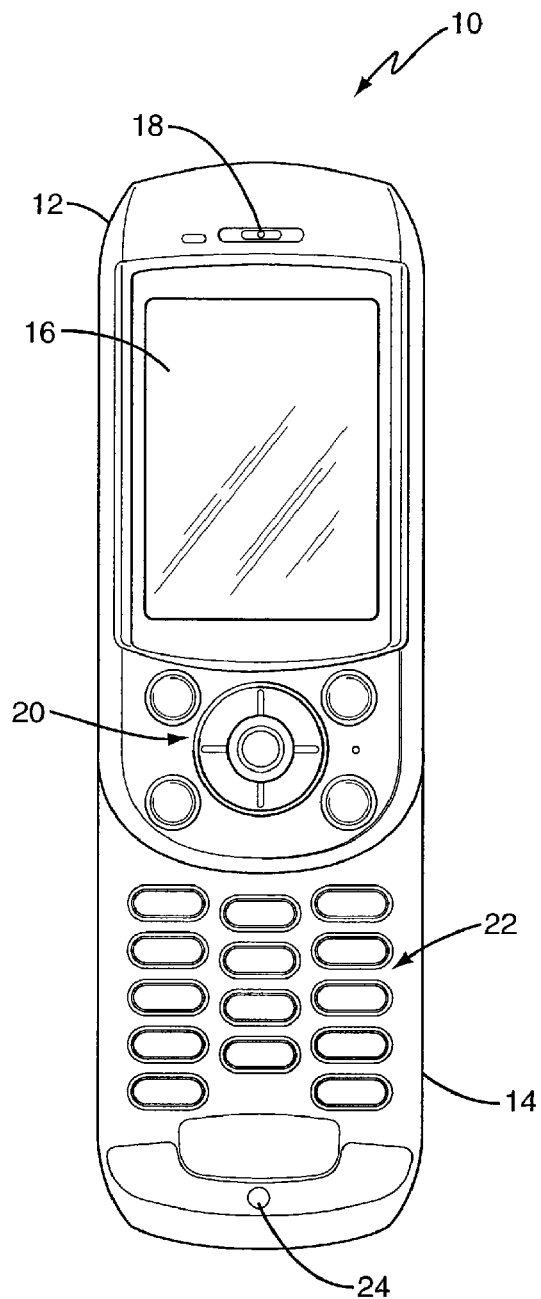
FIG. 1A
FIG. 1B

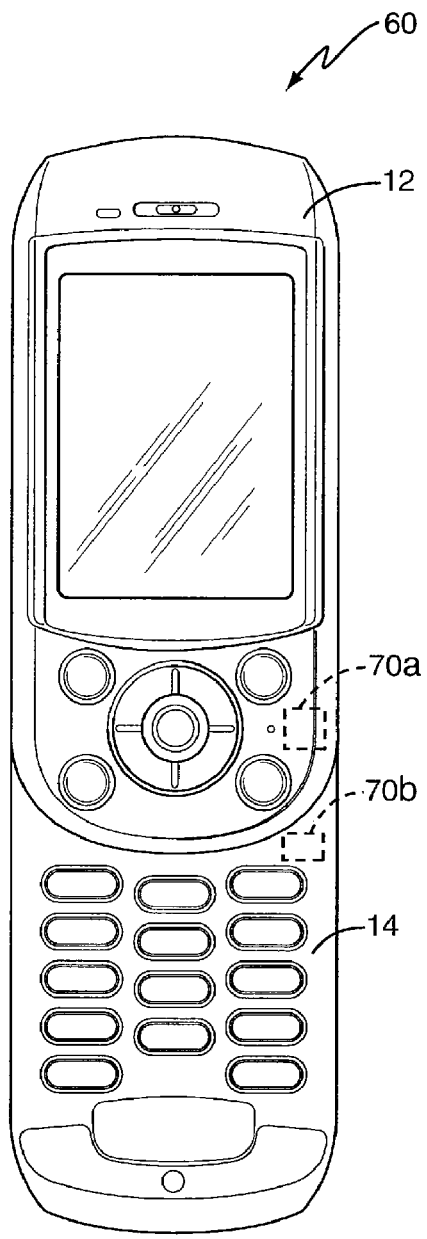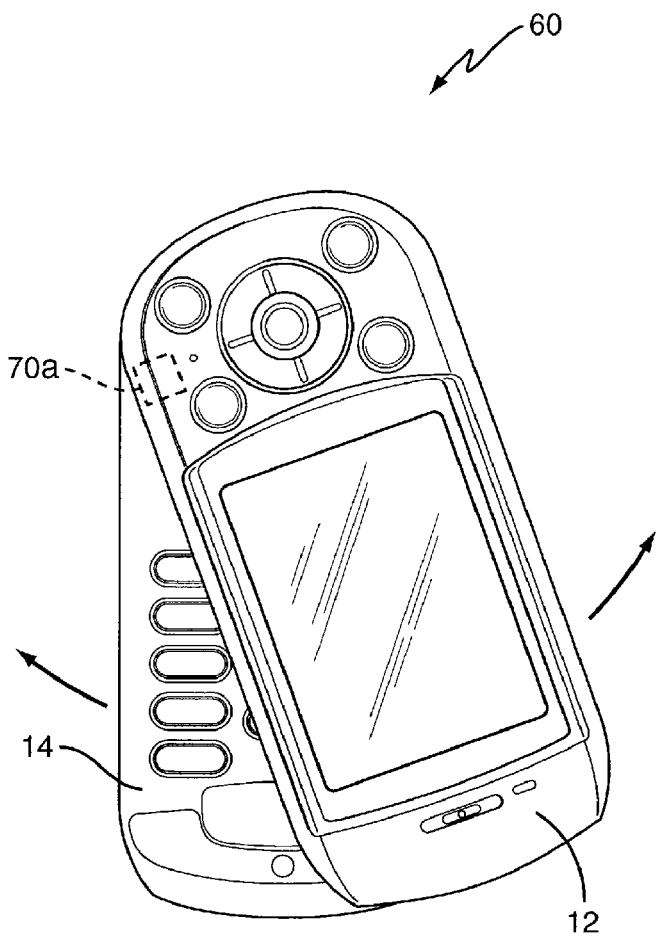
*FIG. 6A*  *FIG. 6B*

MAGNETIC HINGE MECHANISM FOR WIRELESS COMMUNICATION DEVICES

BACKGROUND

The present invention relates generally to wireless communications devices, and particularly to hinge mechanisms for wireless communication devices.

A variety of hinge mechanisms are available for connecting two housings of a wireless communication device. Most, if not all hinges, generally include a device that yieldingly resists movement of the housings between the open and closed positions. For example, hinges that pivotably connect the two housings of a cellular telephone may include corresponding detents associated with each of the housings. The detents contact each other as the user pivots the housings between open and closed positions. This contact resists the pivoting motion, but yields when the user applies a proper amount of force. The detents also function to maintain the housings in the open and closed positions.

Other hinges, such as those of some slider-type phones, are spring-loaded devices that interconnect two housings. Like detents, the springs resist the sliding motion of the housings between the open and closed positions. Once the user applies a proper amount of force, the springs yield to permit the housings to move to the open and closed positions. The springs then bias the housings such that they remain in the open or closed positions.

Structurally, these conventional hinge mechanisms comprise a number of very small components that are difficult for humans to manipulate efficiently. This can be problematic during the manual labor phases of the assembly of the wireless communication device. Additionally, manufacturers generally need to stock a large number of these small components to facilitate fast assembly of both the hinge and the wireless communication device. Thus, conventional hinge designs can lead to increased manufacturing costs, which are passed on to consumers.

SUMMARY

The present invention is directed to a hinge mechanism used in consumer electronic devices, such as a cellular telephone. The hinge mechanism movably connects a first housing of the cellular telephone to a second housing of the cellular telephone such that the housings move relative to each other between an open position and a closed position. Each of the housings also includes a magnetic detent such as earth magnets or electromagnets, for example, which generate their own magnetic fields. As the housings move between the open and closed positions, the magnetic fields interact with each other. The magnetic fields repel each other such that the magnetic detent resists the user moving the first and second housings between the open and closed positions. Once the user applies a sufficient amount of force to overcome the magnetic force, the housings are allowed to move between the open and closed positions.

BRIEF DESCRIPTION OF THE DRAWINGS

FIGS. 1A-1B illustrate a wireless communication device suitable for use with one embodiment of the present invention.

FIGS. 6A-6B illustrate another type of wireless communication device suitable for use with embodiment of the present invention.

DETAILED DESCRIPTION

Figure 2:
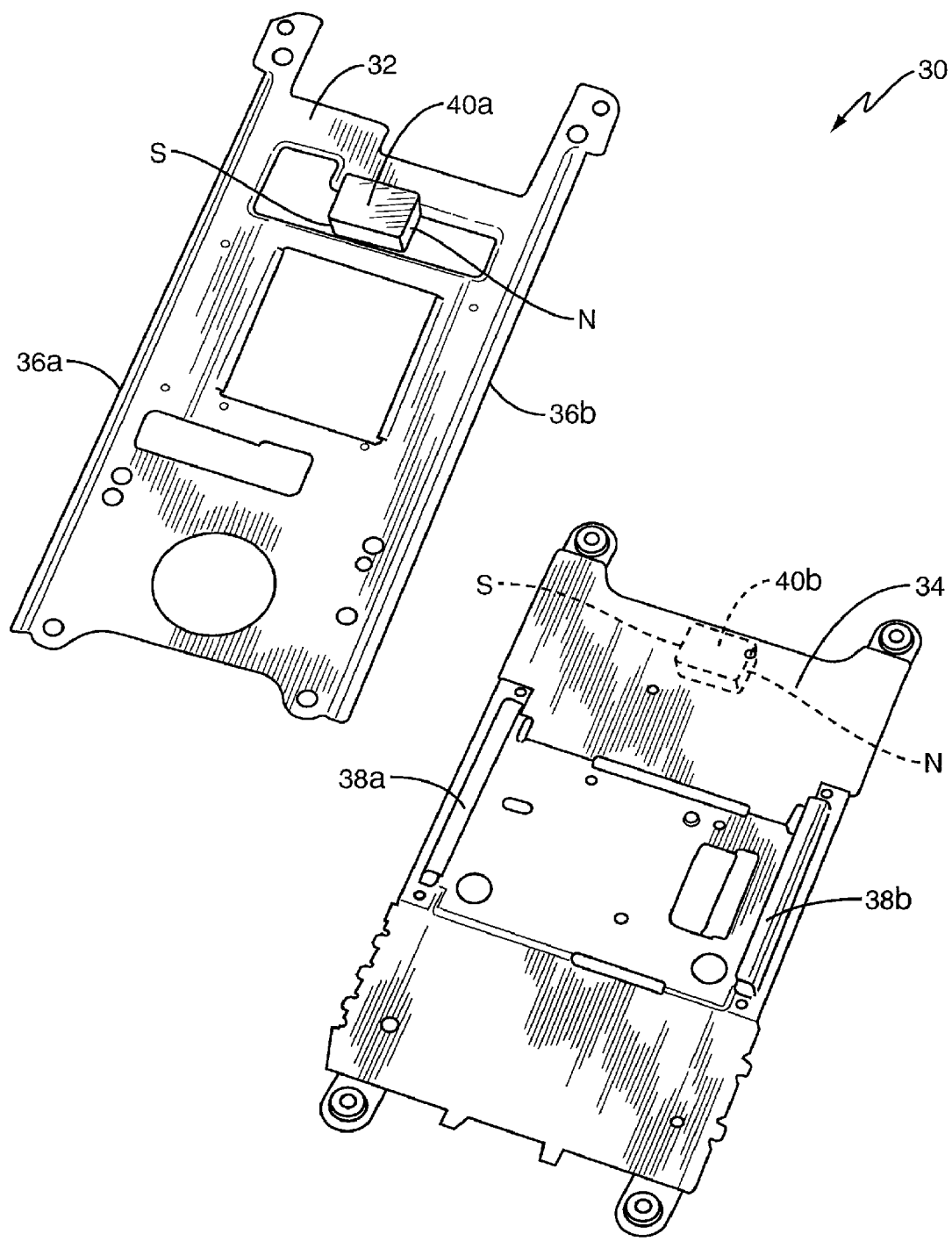
FIG. 2 illustrates some of the component parts of a hinge mechanism suitable for use with one embodiment of the present invention.

The present invention is directed to a hinge mechanism for a wireless communication device. Like conventional hinges, the present invention connects two housings together such that they are movable relative to each other between an open position and a closed position. However, rather than include conventional springs or mechanical detents to yieldingly resist the user opening and closing the housings, the present invention utilizes magnetic fields generated by magnets in each housing. The magnetic fields repel each other to resist the user moving the housings between the open and closed positions, but yield whenever the user applies a sufficient amount of force. Because the magnetic fields provide this yielding resistance, they substantially reduce or eliminate need for hinge mechanisms such as conventional springs or detents.

Turning now to the drawings, FIGS. 1A-1B illustrate a cellular telephone suitable for use with one embodiment of the present invention. The particular type of cellular telephone illustrated is referred to herein as a slider phone 10. However, those skilled in the art will appreciate that this is only one embodiment, and that the present invention is not limited to use only in slider phones. As seen later in more detail, the present invention may be utilized in other types of electronic devices.

Slider phone 10 comprises a first housing 12 slidably connected to a second housing 14. The first housing comprises a display 16, a speaker 18, and a user interface 20, while the second housing 14 includes a keypad 22 and a microphone 24. Each of these components, as well as the communications functions of the slider phone 10, is well known in the art. However, a brief description appears herein for context.

The first and second housings 12, 14 are configured to slide length-wise relative to each other between a closed position (FIG. 1A) and an open position (FIG. 1B). In the closed position, the first housing 12 is positioned such that it substantially covers a surface of the second housing 14. The user may view information, images, and video on display 16, render audio on speaker 18, and use interface 20 to play games and control the operation of slider phone 10. To place an outgoing call, the user slides the first and second housings 12, 14 relative to each other to the open position. This exposes the keypad 22 and microphone 24 on second housing 14 to permit the user to dial numbers and speak to one or more remote parties. To receive incoming calls, the user may slide the housings 12, 14 to the open position to automatically answer the call for the user. Once the call is complete, the user slides the housings 12, 14 to the closed position to terminate the call.

Figure 3:
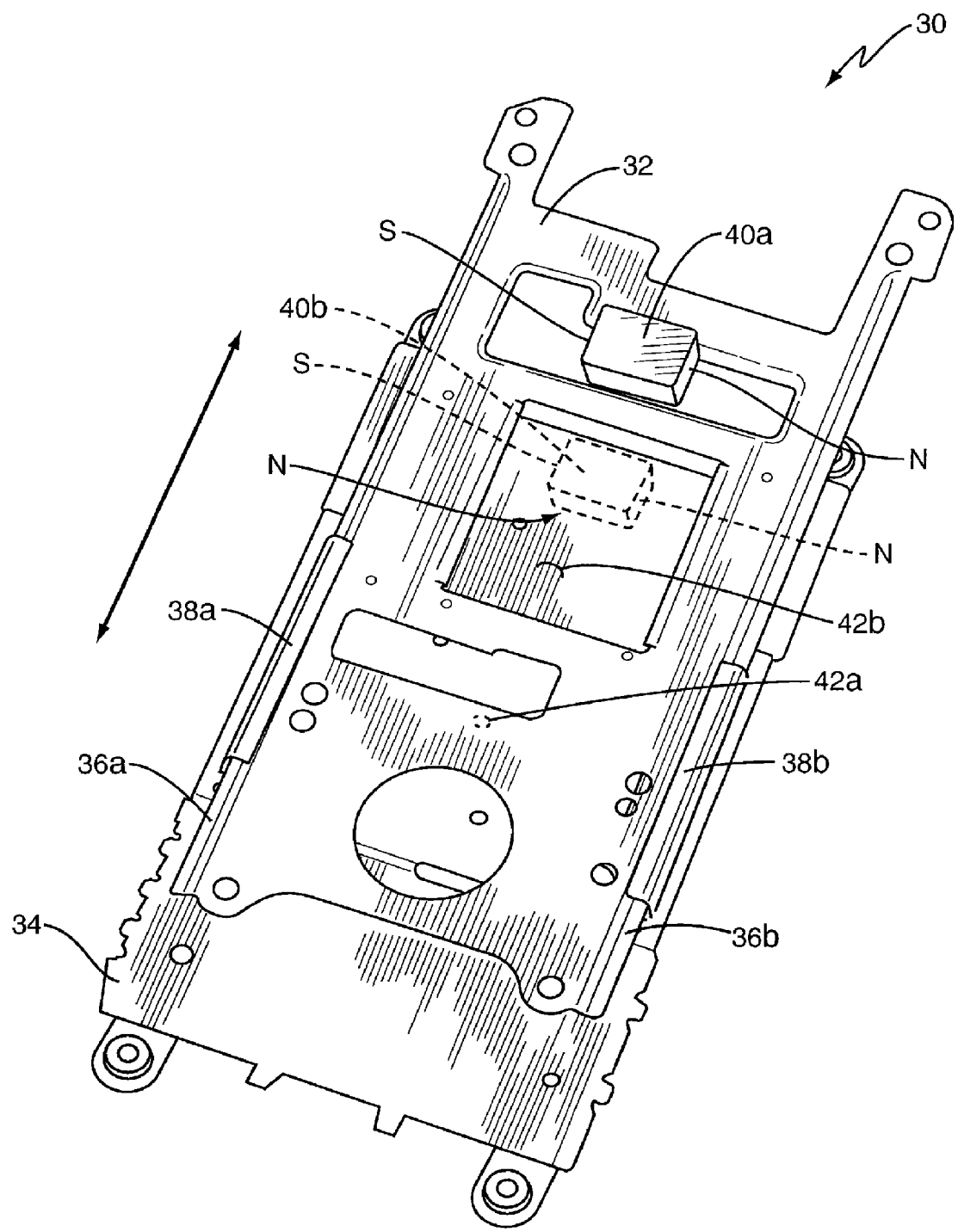
FIG. 3 illustrates an assembled hinge mechanism according to one embodiment of the present invention.

FIGS. 2-3 illustrate one embodiment of a hinge mechanism 30 suitable for use with the present invention. As seen in FIG. 2, the hinge mechanism 30 comprises a pair of chassis 32, 34. Generally, each chassis 32, 34 is formed as a plate from a lightweight metal or metal alloy; however, other materials are also suitable. The first chassis 32 is disposed at least partially within the interior of housing 12 and may carry one or more electrical components. The second chassis 34 is disposed at least partially within the interior of housing 14, and may also carry one or more components. The chassis 32, 34 are fixedly attached to their respective housings using any of a variety of mechanical fasteners (not shown).

In this embodiment, chassis 32 slidingly engages chassis 34 using a rail-channel type engagement. Particularly, chassis 32 comprises a pair of integrally formed rails 36. One rail 36a is formed on one longitudinal side of chassis 32, while the other rail 36b is formed on the other longitudinal side of chassis 32. Chassis 34 comprises a pair of corresponding elongated channels 38 that slidingly receive the rails 36. The channels 38 may be formed separately from the chassis 34 and fixedly attached to opposing sides of chassis 34, or be integrally formed with chassis 34.

FIG. 3 illustrates how the chassis 32, 34 slidingly engage each other according to one embodiment. As seen in FIG. 3, each channel 38 is sized to slidingly receive a rail 36. In use, each rail 36 slides back and forth through its corresponding channel 38 such that the chassis 32, 34, and their corresponding housings 12, 14, slide relative to each other between the open and closed positions. Mechanical stops 42 may be formed at selected positions on one or both of the chassis 32, 34 to restrict the amount of sliding movement between the rails 36 and the channels 38. In this embodiment, the stops 42 comprise projecting members that contact each other whenever the chassis 32, 34 slide to a predetermined point. This would limit the range of movement for the chassis 32, 34 and the housings 12, 14, but prevents the chassis 32, 34 and the housings 12, 14 from separating from each other during movement.

As previously stated, conventional hinge mechanisms include components such as springs (not shown), detents (not shown), and other mechanical devices to yieldingly resist a user sliding the housings between the open position and the closed position. Generally, the user "feels" this resistance as a detent force that initially opposes the sliding motion. This resistance yields, however, whenever the user provides a sufficient amount of force. Such conventional components are small and difficult for humans to manipulate, which can adversely affect manufacturing costs. Therefore, the present invention removes these conventional components from the hinge mechanism 30 altogether, and instead, uses a magnetic field to provide the yielding resistance.

As seen in FIGS. 2-3, one embodiment of the present invention fixedly attaches a magnet 40a, 40b to each chassis 32, 34. By way of example only, the magnets 40 may be attached to their respective chassis 32, 34 using any known adhesive compound or mechanical faster. Each magnet 40a, 40b generates its own magnetic field, and is arranged at corresponding ends of their respective chassis 32, 34 such that their magnetic "poles" align. Specifically, the North N and South S poles of magnet 40a are oriented in substantially the same direction as the North N and South S pole of magnet 40b. In this particular orientation, the polarities of the respective magnetic fields oppose each other such that magnets 40a, 40b repel each other whenever they come into close proximity of each other.

As seen in FIG. 3, the magnets 40 come into close proximity of each other whenever the user slides the housings 12, 14, between the open and closed positions. Particularly, the magnets 40a, 40b pass each other as the chassis 32, 34 slide relative to each other between the open and closed positions. As the magnets 40a, 40b approach each other, their respective magnetic fields repel each other. The user "feels" the repelling force as a resistance that opposes the sliding motion of the housings. The opposing force yields, however, when the user applies a sufficient amount of force to allow the user to move the housings 12, 14 to the open and closed positions.

Figure 4:
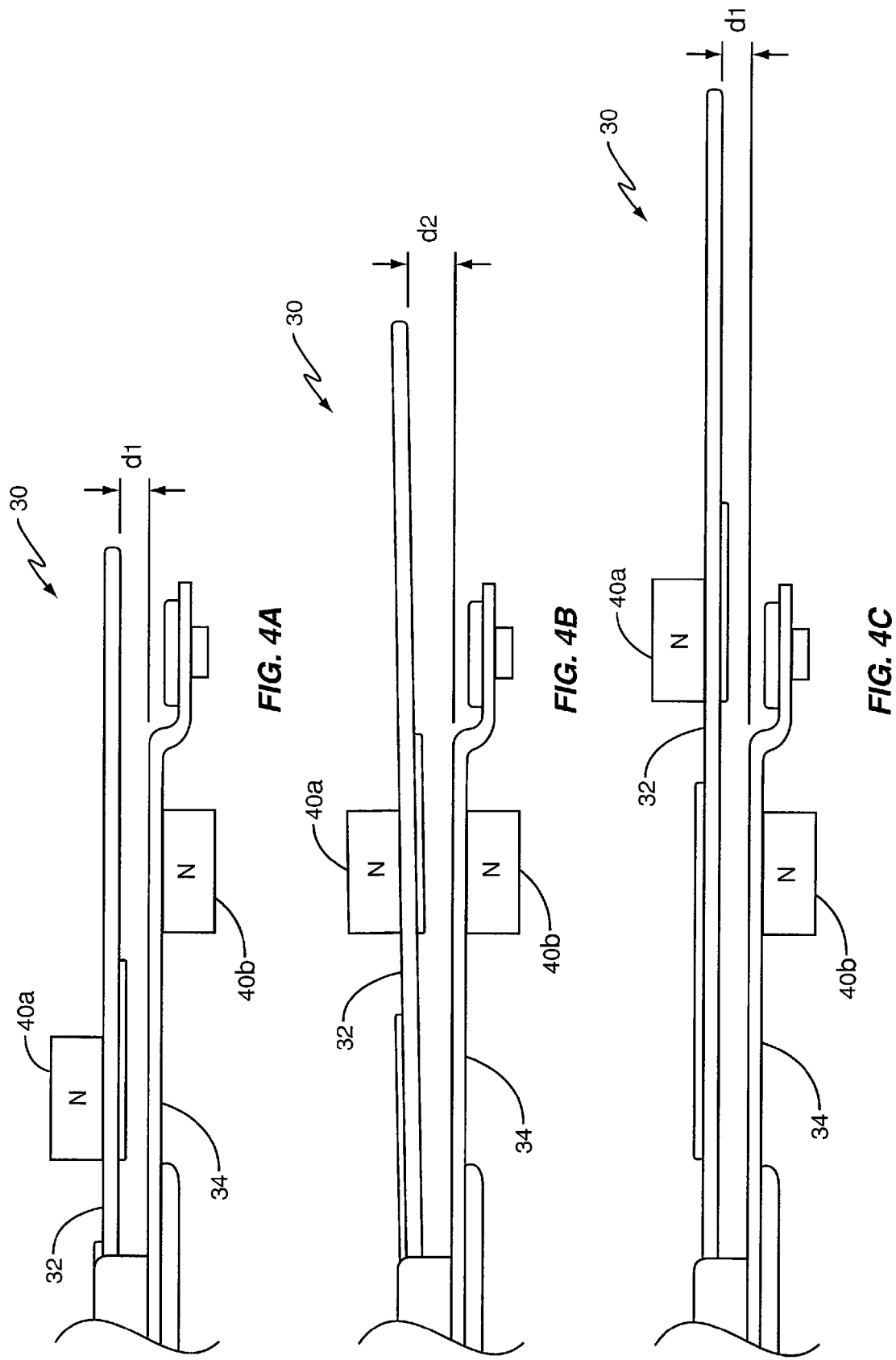
FIGS. 4A-4C illustrate a side view of an assembled hinge mechanism according to one embodiment of the present invention.

FIGS. 4A-4C illustrate a side view of the hinge mechanism 30 with the chassis 32, 34 arranged in sliding engagement as they move between the open and closed positions. As seen in FIGS. 4A-4C, both magnets 40a, 40b are oriented with their N poles facing substantially the same direction.

In the closed position (FIG. 4A), a sufficient lateral distance separates the magnets 40 such that their respective magnetic fields may repel each other to maintain the housings 12, 14 in the closed position. Additionally, the chassis 32, 34 are spatially separated by a distance of d1. As the user moves the housings 12, 14 to the open position, the magnets 40 come into close proximity of each other (FIG. 4B). As the magnets 40 pass by each other, the repelling force between the respective magnetic fields increases. The user feels this repelling force as a force that yieldingly resists the movement of the housings 12, 14. In addition, the repelling force may urge the chassis 32, 34 to separate slightly such that the spatial separation between the housings increases to a distance of d2. To overcome this resistance, the user continues to move the housings 12, 14 to the open position (FIG. 4C). As the magnets 40 move away from each other, the repelling force between the respective magnetic fields decreases. The chassis 32, 34 then return to their initial separation distance of d1.

Changing the separation distances between the chassis 32, 34 beneficially maintains the structure of the chassis 32, 34. Particularly, with devices having conventional hinge mechanisms, the force applied by the users to the housings 12, 14 when moving them between the open and closed positions tends to urge the chassis 32, 34 into contact. Over time, the chassis 32, 34 may warp such that they are separated by a distance of less than d1. It is possible that the reduced distance could allow one chassis 32 to contact the other chassis 34 during movement. This could create an undesirable "scraping" noise between the two chassis 32, 34 and limit the usable life of the housings 12, 14. Increasing the distance slightly to d2, however, counteracts this user-applied warping force to the chassis 32, 34. This allows the chassis 32, 34 to remain separated by a distance of about d1 when the housings are in the open or closed positions.

It should be noted that the present invention does not require changing the separation distance between the chassis 32, 34. Rather, the magnetic fields may repel each other such that the distances d1 and d2 are maintained to be substantially equal. For example, the magnets 40 may be positioned on their respective chassis 32, 34 such that when the housings are in the open and closed positions, the magnetic fields repel each other to maintain the separation distance at d1. Further, the chassis 32, 34 are fixedly attached to the housings 12, 14, which would leave little or no "play" between the chassis 32, 34. This rigidity could prevent the chassis 32, 34 from separating further as the magnets 40 pass each other when moving between the open and closed positions. Thus, the distance d2 could be equal to or greater than d1.

The magnets 40 may comprise any magnets known in the art. For example, in one embodiment, magnets 40 comprise a pair of permanent ferrite magnets. Permanent ferrite magnets, or hard ferrite magnets, are manufactured from electrically non-conductive ferromagnetic ceramic materials including, but not limited to, Hematite and Magnetite. The oxides of other metals may also be used to construct this type of magnet. In other embodiments, the magnets 40 comprise permanent Alnico magnets produced from alloys composed of aluminum, nickel and cobalt. In some cases, these alloys may additionally include iron, copper, and titanium.

In other embodiments magnets 40 comprise rare-earth magnets. Rare-earth magnets are strong, permanent magnets constructed from alloys of rare earth elements. Examples of rare-earth magnets include, but are not limited to, Neodymium magnets made from neodymium, iron, and boron, and Samarium-cobalt magnets composed of samarium and cobalt. Rare-earth magnets generally maintain their ability to generate magnetic fields for long periods of time and are substantially stronger than ferrite or alnico magnets.

Figure 5:
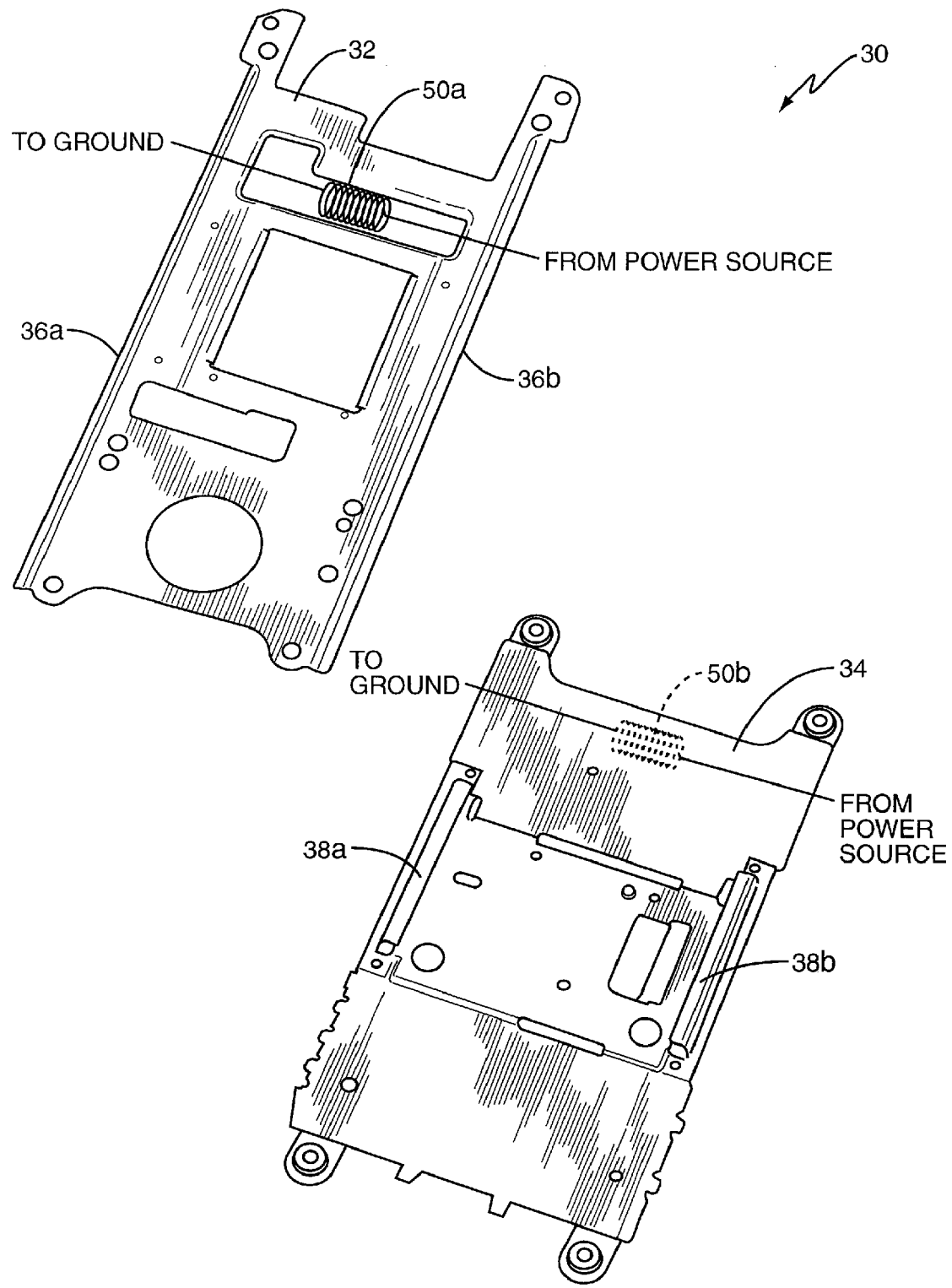
FIG. 5 illustrates a hinge mechanism configured according to another embodiment of the present invention.

Those skilled in the art will appreciate that the present invention is not limited to using manufactured or naturally occurring earth magnets. In another embodiment, for example, the present invention generates the yielding resistance using electromagnetism. FIG. 5 illustrates one embodiment wherein the magnet comprises a pair of electromagnets 50a, 50b—each comprising a coil of wire connected to a power source such as a battery (not shown). The electromagnets 50 produce their respective magnetic fields using the flow of electric current produced by the power source. As long as the current exists, the electromagnets 50 produce their respective magnetic fields. The magnetic fields disappear, however, when the current ceases.

The magnets 40 and/or electromagnets 50 may vary in their shapes, sizes, strengths, and placements on the chassis 32, 34. Varying one or more of these parameters could allow a manufacturer, for example, to vary the intensity of the magnetic repelling force, and thus, vary the amount of yielding resistance a user might feel. For example, including stronger magnets 40, 50 could generate stronger magnetic fields, which the user might feel as a stronger yielding resistance opposing the opening and closing of the housings 12, 14.

Similarly, placing the magnets 40, 50 in different positions within the housings 12, 14 could achieve a like result. By way of example, the figures illustrate the magnets 40 and the electromagnets 50 as being on opposing surfaces of opposing chassis 32, 34 such that the magnets 40, 50 pass "over" each other when moving between the open and closed positions. However, the magnets 40 and/or the electromagnets 50 may be positioned on any surface of their respective chassis 32, 34. Likewise, the present invention does not require that the magnets 40, 50 "pass over" each other between the open and closed positions. Instead, the magnets 40, 50 may be positioned such that their respective ends repel each other whenever they "pass by" each other. In embodiments utilizing this latter placement, the N poles of the magnets 40, 50 on chassis 32, 34 would face each other. As the user moved the housings 12, 14 between the open and closed positions, the N poles would repel each other.

Those skilled in the art will also appreciate that the present invention is not limited to being used in slide hinge mechanisms, but rather, may be used in any hinge mechanism. FIGS. 6A-6B, for example, show perspective views of another type of wireless communication device suitable for use with the present invention. As seen in FIG. 6, a jack knife phone 60 comprises the first and second housings 12, 14. Each housing 12, 14 comprises a magnet 70 within the interior of the housing 12, 14. As the user slidingly pivots the first and second housings 12, 14 about its hinge, the magnets 70 come into close proximity to each other. The magnetic fields of the two magnets 70 repel each other to initially resist the user opening and closing the housings 12, 14, but yield when the user applies a sufficient amount of force.

It should be noted that the description and the drawings illustrate the present invention as being used in cellular telephones. However, those skilled in the art will readily appreciate that the present invention is not so limited. The present invention may be used in any hinge mechanism to provide the "feel" and functionality of the conventional springs and/or detent mechanisms. Other types of devices that are suitable for use with the present invention include, but are not limited to, Personal Digital Assistants (PDAs), computing devices, gaming devices, satellite telephones, and the like.

In addition, there is no requirement that the chassis 32, 34 each have magnets 40 or electromagnets 50. Rather, one of the chassis 32, 34 may have a magnet 40 while the other of the chassis 32, 34 has an electromagnet 50. Further, the magnets 40 and/or electromagnets 50 may be any shape, size, intensity, and/or placement desired.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communication device comprising:
   a first housing pivotably connected to a second housing, each housing having an interior chassis;
   a hinge to pivotably connect the first and second housings such that the first and second housings pivot relative to each other between an open position and a closed position; and
   a magnetic detent configured to generate a yielding resistance when the first and second housings pivot between the open and closed positions, the magnetic detent comprising:
      a first magnet fixedly attached to the interior chassis of the first housing;
      a second magnet fixedly attached to the interior chassis of the second housing; and
      the first and second magnets being arranged such that, as the first and second housing sections pivot between the open and closed positions, the magnets urge the interior chassis away from each other to maintain a separation distance between the interior chassis.

2. The device of claim 1 wherein each of the first and second magnets generate a magnetic field that repel each other when the first and second housings pivot between the open and closed positions.

3. The device of claim 1 wherein the first and second magnets are arranged to urge the interior chassis apart as the first and second housing sections pivot between the open and closed positions.

4. The device of claim 1 wherein the first and second magnets comprise earth magnets.

5. The device of claim 1 wherein the first and second magnets comprise electromagnets.

6. A method of connecting the first and second housings of a wireless communication device, the method comprising:
   pivotably connecting a first housing to a second housing such that the first and second housings pivot relative to each other between an open position and a closed position, each housing comprising respective interior chassis; and arranging magnets on respective surfaces of the interior chassis of said first and second housings by fixedly attaching a first magnet to the first housing, and a second magnet to the second housing so as to: yieldingly resist the pivoting movement of the first and second housings between the open and closed positions; and maintain a separation distance between the respective interior chassis as the first and second housing sections pivot between the open and closed positions.

7. The method of claim 6 wherein the first magnet is fixedly attached to the chassis on the interior of the first housing, and the second magnet is fixedly attached to the chassis on the interior of the second housing.

8. The method of claim 6 further comprising aligning the first and second magnets such that the first magnet repels the second magnet.

* * * * *